(12) United States Patent
Anderson et al.

(10) Patent No.: US 7,817,570 B1
(45) Date of Patent: Oct. 19, 2010

(54) METHOD AND APPARATUS FOR PROVIDING AUTOMATED DIAGNOSTICS OF NETWORKS USING MULTIPLE VIRTUAL CIRCUITS

(75) Inventors: Thomas Anderson, Imperial, MO (US); Paritosh Bajpay, Edison, NJ (US); Roberta Bienfait, Norcross, GA (US); Mojgan Dardashti, Holmdel, NJ (US); Mark Hunt, Plano, TX (US); Jackson Liu, Middletown, NJ (US); Zhiqiang Qian, Holmdel, NJ (US); Michael John Zinnikas, North Brunswick, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 500 days.

(21) Appl. No.: 11/618,906

(22) Filed: Dec. 31, 2006

(51) Int. Cl.
*H04J 1/16* (2006.01)
(52) U.S. Cl. .................. 370/252; 370/241; 370/242; 725/108; 709/224; 714/100
(58) Field of Classification Search .............. 370/252, 370/253, 241, 242, 244, 245, 248, 353, 396, 370/397, 485; 714/4, 25, 37, 39, 42, 43, 714/47, 100; 709/223, 224; 725/105, 106, 725/107, 108, 109, 111, 118
See application file for complete search history.

(56) References Cited

U.S. PATENT DOCUMENTS

| 6,430,150 | B1 | 8/2002 | Azuma et al. |
| 6,788,765 | B1 | 9/2004 | Beamon |
| 2002/0073355 | A1* | 6/2002 | Cerami et al. .................. 714/4 |
| 2002/0078017 | A1* | 6/2002 | Cerami et al. .................. 707/1 |
| 2003/0149919 | A1* | 8/2003 | Greenwald et al. ............ 714/43 |
| 2005/0183129 | A1* | 8/2005 | Cerami et al. ............... 725/105 |
| 2006/0015917 | A1 | 1/2006 | Rozental |

OTHER PUBLICATIONS

U.S. Appl. No. 11/618,891; filed Dec. 31, 2008, copy consists of 21 pages.

* cited by examiner

*Primary Examiner*—Jason E Mattis
*Assistant Examiner*—Dady Chery (57) ABSTRACT

A method and system for providing automated diagnostics of networks using multiple virtual circuits are disclosed. For example, the method receives a ticket indicating a problem. The method then determines if the problem is associated with a configuration mismatch and determines if the problem is associated with at least one physical channel supporting a plurality of virtual circuits. The method then verifies status of each of the plurality of virtual circuits if the problem is not associated with the configuration mismatch or the at least one physical channel. The method then reports a result of verifying the status of each of the plurality of virtual circuits.

17 Claims, 5 Drawing Sheets

METHOD AND APPARATUS FOR PROVIDING AUTOMATED DIAGNOSTICS OF NETWORKS USING MULTIPLE VIRTUAL CIRCUITS

The present invention generally relates to troubleshooting networks and, in particular, to a method and apparatus for providing automated diagnostics of networks using multiple virtual circuits.

BACKGROUND OF THE INVENTION

Networks, such as for example, Ethernet networks and Synchronous Optical Networks (SONET), provide network architecture for high speed data transmissions. Current network architecture may comprise a vast number of components, connections, logical channels and physical channels located around the globe that carry data from endpoint to endpoint.

An individual or an enterprise customer may subscribe for services over the network. For example, a customer may subscribe to a network for Virtual Private Network (VPN) access. VPN provides protocol that provides an access provider the ability to provide multiple logical channels, e.g., virtual circuits, over a single physical channel.

Occasionally, a customers may report problems on the network affecting their service. Currently, when a problem is reported, troubleshooting the problem is performed manually by technicians. However, as discussed above, due to the vast size of the network architecture, manually troubleshooting the root cause of the problem with technicians may be extremely time consuming or expensive. Moreover, in network architectures utilizing multiple logical channels on a single physical channel, e.g. VPN, Virtual Local Area Networks (VLAN) and the like, identifying which logical channel has a problem may be difficult. Consequently, service to the customer may be affected due to the network being down or degraded for an extended period of time, thereby creating customer dissatisfactions. In turn, the extended periods of down time to the network may have an impact on the revenue of a network service provider.

Therefore, there is a need for a method for providing an automated diagnostics of networks using multiple virtual circuits.

SUMMARY OF THE INVENTION

In one embodiment, the present invention provides a method and system for providing automated diagnostics of networks using multiple virtual circuits. For example, the method receives a ticket indicating a problem. The method then determines if the problem is associated with a configuration mismatch and determines if the problem is associated with one physical channel supporting a plurality of virtual circuits. The method then verifies status of each of the plurality of virtual circuits if the problem is not associated with the configuration mismatch or one physical channel. The method then reports a result of verifying the status of each of the plurality of virtual circuits.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
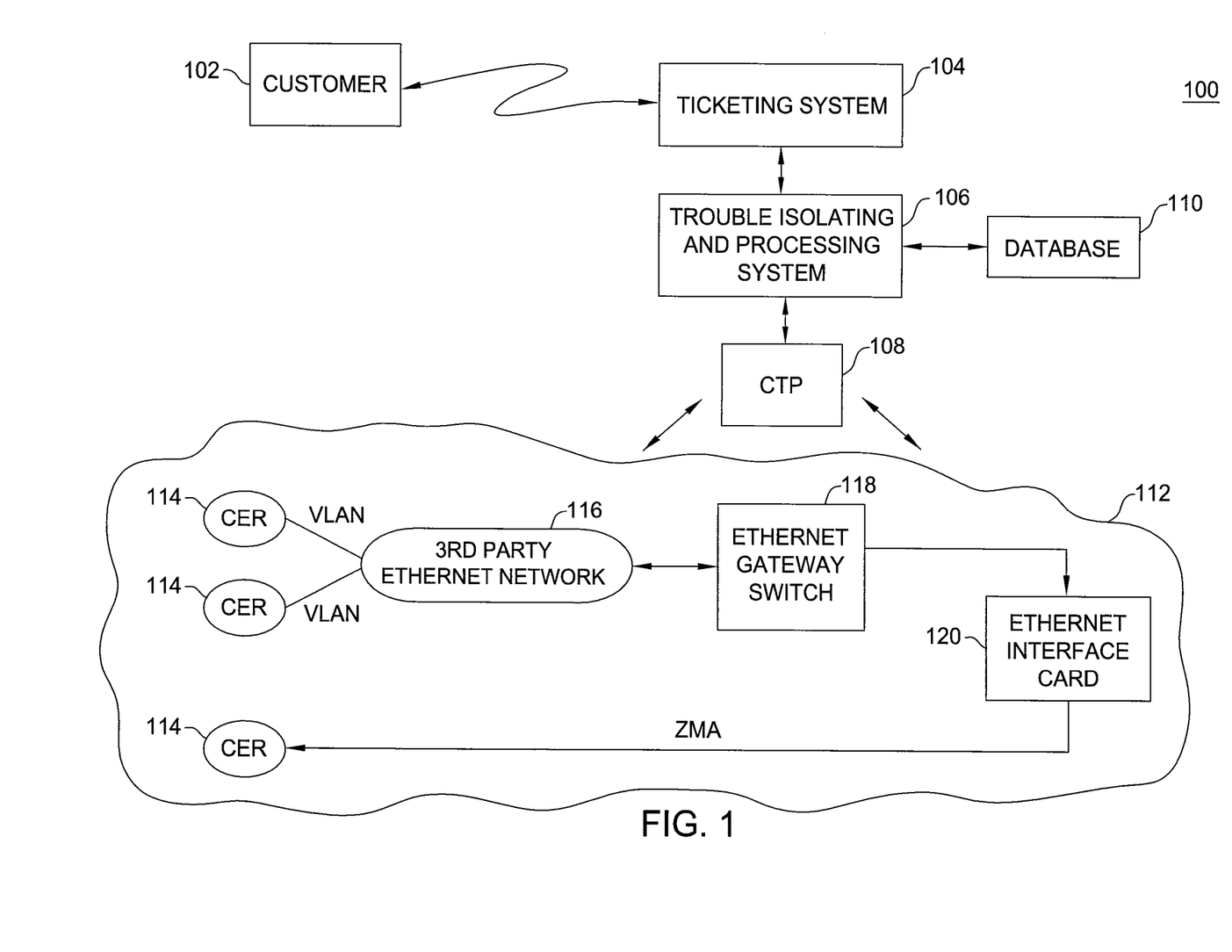
FIG. 1 depicts a high-level block diagram of an exemplary architecture for providing automated diagnostics of networks using multiple virtual circuits according to one embodiment of the present invention.

FIG. 1 depicts a high-level block diagram of an exemplary system 100 for providing automated network diagnostics according to one embodiment of the present invention. In one embodiment, the system 100 comprises a ticketing system 104, an automated diagnostics system (e.g., a trouble isolating and processing system) 106, a common testing platform (CTP) 108, a database 110 and a network 112. In operation, a customer 102 may contact the ticketing system 104 to report a problem with its service. In an exemplary embodiment, the ticketing system 104 may include an interactive voice response (IVR) module to receive a reported problem from the customer 102.

In an exemplary embodiment, a ticket is generated in response to the problem reported by the customer 102. The generated ticket may be forwarded to the automated diagnostics system 106. In an exemplary embodiment, automated diagnostics system 106 may control all of the test scripts that are executed by the CTP 108. For example, automated diagnostics system 106 controls which test scripts are to be executed for testing each component in the network 112.

Automated diagnostics system 106 may also have access to database 110. One skilled in the art will recognize that there may be one or more databases 110. Database 110 may store previously reported alarms, test scripts that are used to test the components of network 112, and/or configuration information associated with the components of network 112. Database 110, may also store any other information required by automated diagnostics system 106 to perform the methods described herein.

FIG. 1 illustrates the CTP 108 being generally connected to network 112. In an exemplary embodiment, network 112 may be any network for providing high speed data transmission such as, for example, an Ethernet network or a Synchronous Optical Network (SONET). In an exemplary embodiment, network 112 may utilize a single physical channel to distribute multiple logical channels, for example, multiple virtual circuits. For example, a Virtual Private Network (VPN) or a Virtual Local Area Network (VLAN) may be implemented via such a configuration of a single physical channel having multiple virtual circuits.

In an exemplary embodiment, CTP 108 is connected to the network 112 at multiple testing points. By being connected at multiple testing points, CTP 108 is able to better isolate the root cause of problems detected in network 112. Connections to multiple testing points provide CTP 108 with the capability to execute test scripts on any layer of network 112.

In an exemplary embodiment, network 112 may comprise various elements spanning from a plurality of customer edge routers (CERs) 114 to an Ethernet interface card 120. As shown in FIG. 1, one skilled in the art may recognize that system 100 is not limited to any number of CERs 114. Although three (3) CERs 114 are shown, the embodiments of the present invention may have any number of CERs 114.

As illustrated by example in FIG. 1, CER 114 may be connected to a third party Ethernet network 116. Third party Ethernet network 116 may be an access provider such as a Local Exchange Carrier (LEC) or an independent provider. CER 114 may alternatively be connected directly to the Ethernet interface card 120. In one embodiment, third party Ethernet network 116 is connected to an Ethernet Gateway Switch 118. In turn, the Ethernet Gateway Switch 118 is connected to the Ethernet interlace card 120. In one embodiment, network 112 may have a single physical channel from the Ethernet interface card to the third party Ethernet network 116. However, third party Ethernet network 116 may have multiple virtual circuits to each CER 114, such as VLAN connections.

Customer 102 may wish to subscribe to services over network 112. For example, customer 102 may subscribe to a service over network 112 via one of the multiple virtual circuits such as, for example, a VLAN connection. As discussed above, network 112 may have at least one physical channel that may be identified via a circuit ID. However, each physical channel may actually comprise a plurality of logical channels such as, for example, virtual circuits that are identified via an IP Address. Therefore, identifying problems on the logical channels, e.g., virtual circuits, is much more difficult. In one embodiment, the present invention provides a method for automating the processing of a ticket to identify a problem associated with one or more logical channels, e.g., virtual circuits.

Figure 2:
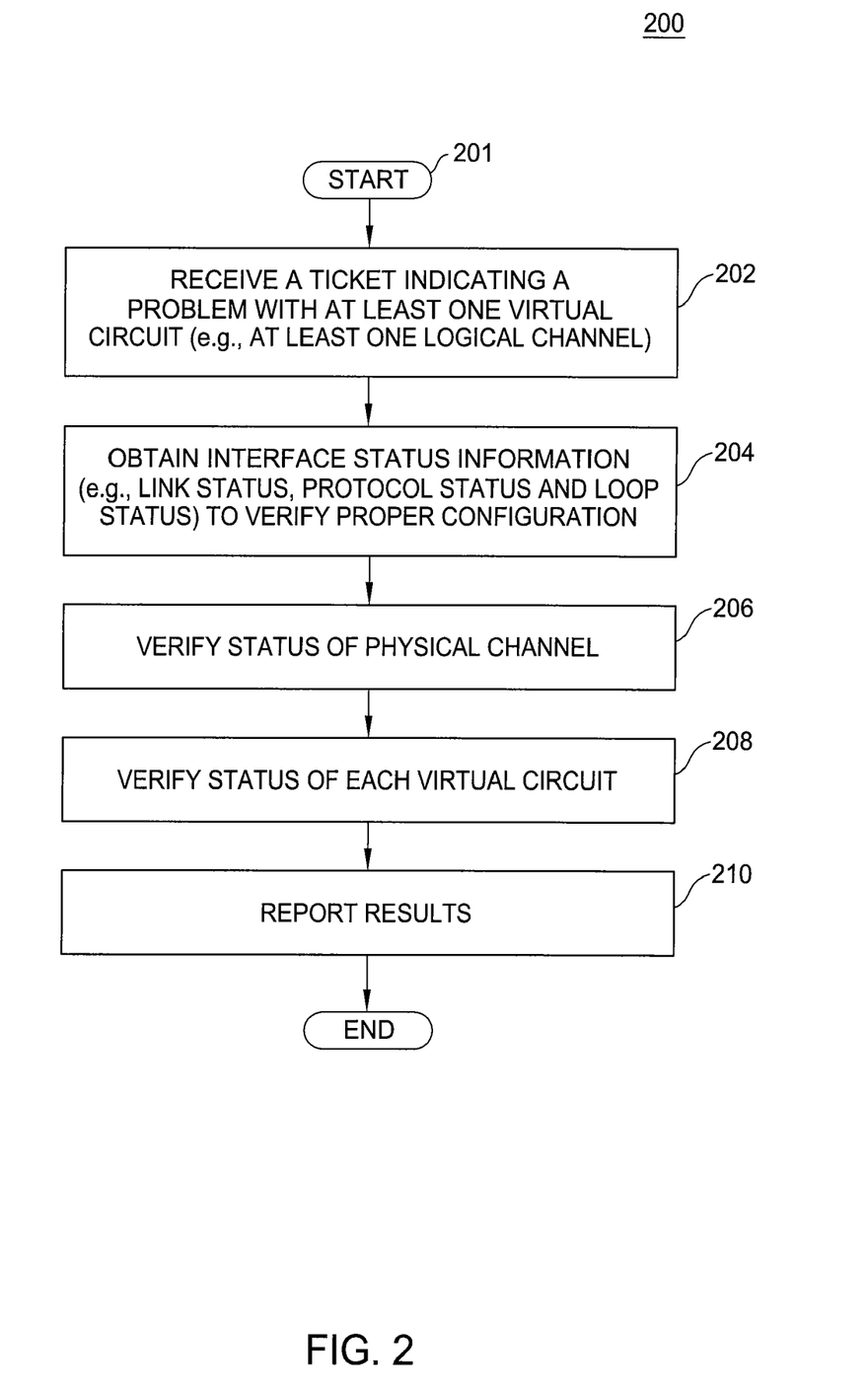
FIG. 2 depicts a flow diagram of a method for providing automated diagnostics of networks using multiple virtual circuits with according to one embodiment of the present invention.

FIG. 2 depicts a flow diagram of a method 200 for providing automated network diagnostics according to one embodiment of the present invention. For better understanding of the invention, the reader should simultaneously refer to FIGS. 1 and 2.

The method 200 starts at step 202 where a ticket is received indicating a problem with at least one of a plurality of virtual circuits or logical channels of a network. As discussed above, in Ethernet networks for example, there may be one physical channel supporting a plurality of logical channels or virtual circuits. If the physical channel is deemed to be operating normally, the network service provider will still have to troubleshoot the problem down to each logical channel. Therefore, trying to identify which virtual circuit is down, degraded or experiencing a problem may be very difficult and time consuming if performed manually.

At step 204, method 200 obtains interface status information, e.g., link status, protocol status and/or loop status. The interface status information is obtained so that method 200 can verify that the interface is properly configured.

At step 206, method 200 verifies the status of the underlying physical channel. Namely, one or more test scripts are executed to determine whether the underlying physical channel is operating properly.

At step 208, if the underlying physical channel is deemed to be operating properly, then method 200 will verify the status of each virtual circuit or logical channel. For example, one or more test scripts are executed to determine whether each logical channel is up or down.

At step 210, method 200 reports the results. For example, method 200 may simply log the results of the diagnostic test scripts in a ticket report system such as Ticketing System 104. In an alternative embodiment, method 200 may report the results such that the ticket is moved to a reporting system indicating that additional actions must be promptly taken to resolve the ticket, i.e., the ticket must receive immediate action by a service technician. In another embodiment, method 200 may report the results such that the ticket is moved to a reporting system where a work order is to be generated. In another embodiment, method 200 may report the results such that the ticket is moved to a reporting system where a third party, e.g., the LEC 120, or the customer is notified. Thus, method 200 provides an efficient network troubleshooting approach, thereby reducing costs and expediting the proper processing of tickets.

Figure 3A:
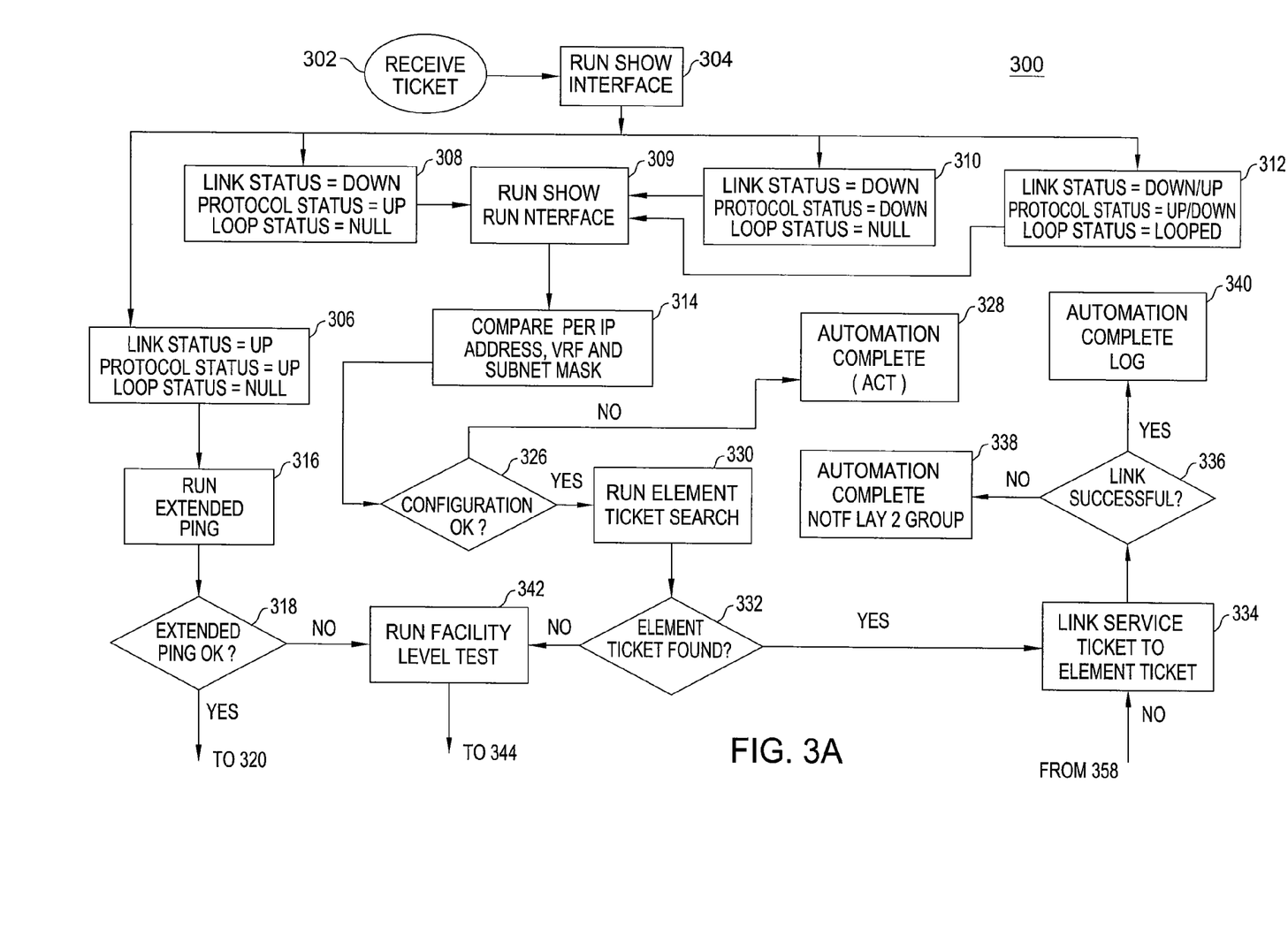
FIG. 3 depicts a more detailed flow diagram of a method for providing automated diagnostics of networks using multiple virtual circuits according to one embodiment of the present invention.
Figure 3B:
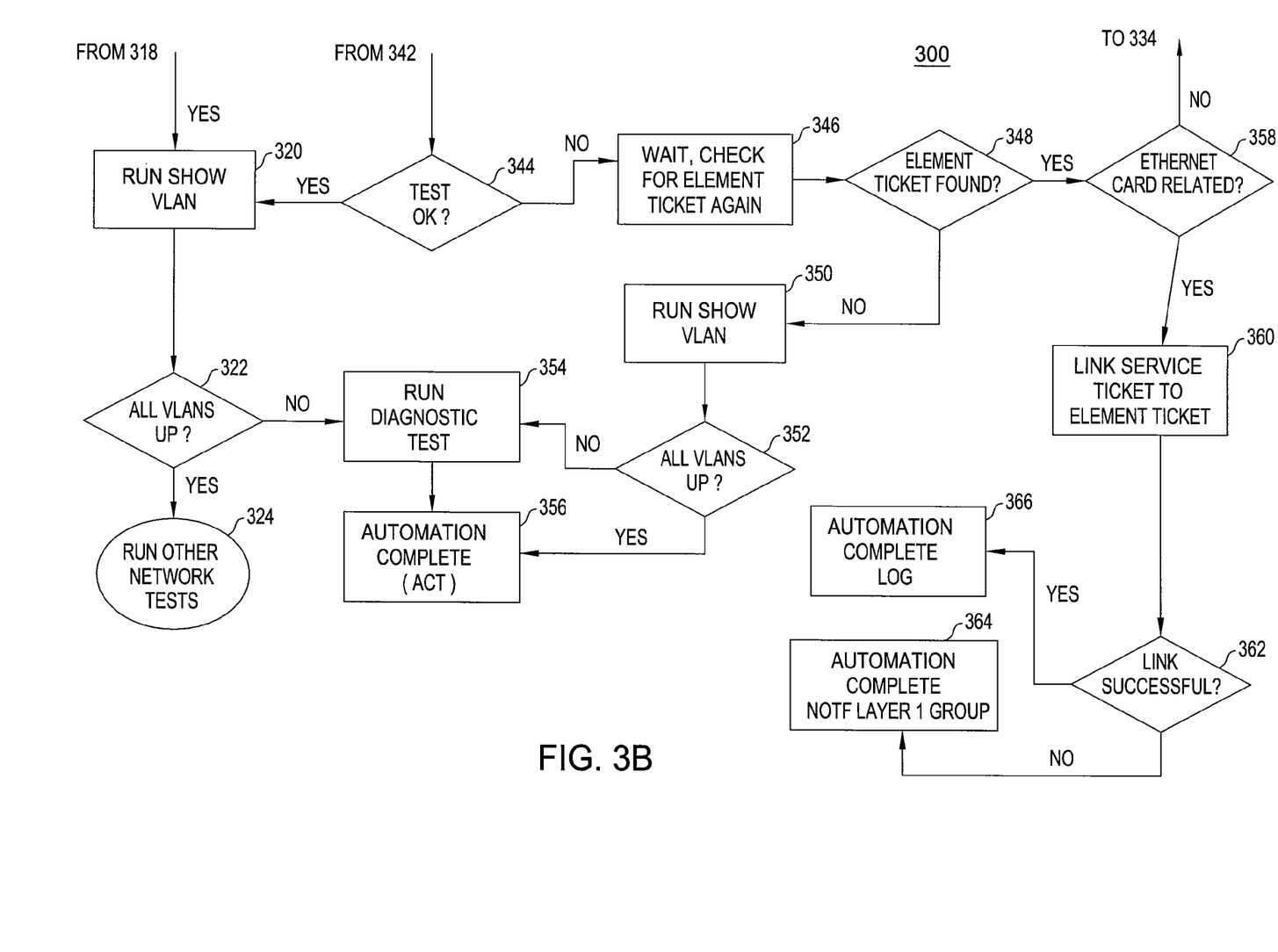

FIG. 3 depicts a more detailed flow diagram of a method 300 for providing automated network diagnostics according to one embodiment of the present invention. Similar to FIG. 2, for better understanding of the invention, the reader should simultaneously refer to FIGS. 1 and 3.

In an exemplary embodiment, method 300 begins at step 302 where a problem ticket may be received and a diagnosis may be initiated. Subsequently, at step 304, method 300 may run test script logic "Show Interface".

In an exemplary embodiment, test scripts "Show Interface" may execute two snapshots of network 112. For example, the snapshots may be collection of configuration information of the elements within network 112, such as routers and switches within network 112. The snapshots may comprise status information of various connections within network 112 such as, for example, link status information, protocol status information, loop status information and the like. Link status information may be the status of a link from CER 114 to the Ethernet 120 or a Provider Edge Router (PER). Protocol status may be the status of a protocol type that is being used or supported. Loop status may be the status of a loop between CER 114 and third party Ethernet network 116. For example, sometimes a loop may be established between CER 114 and third party Ethernet network 116 for pre-service testing. If a loop was established and never removed, the loop must be removed before method 300 may proceed because the loop will affect the automated diagnostics tests run by method 300.

Subsequently, the path of method 300 will depend on the various status information that is collected at step 304 such as, for example, the link status, protocol status and the loop status.

At step 306, the collected status information indicates the link status as being "up", the protocol status as being "up" and the loop status as being "null". At step 308, the collected status information indicates the link status as being "down", the protocol status as being "up" and the loop status as being "null". At step 310, the collected status information indicates the link status as being "down", the protocol status as being "down" and the loop status as being "null". At step 312, the collected status information indicates the link status as being "up" and the protocol status as being "down" or the link status as being "down" and the protocol status as being "up". In either case, at step 312, the loop status as being "looped".

If method 300 proceeds to step 306 based on the status information collected at step 304, then method 300 proceeds to step 316. At step 316, method 300 executes test script "Extended Ping". For example, the "Extended Ping" tests the channel between the CER 114 to Ethernet interface card 120.

In an exemplary embodiment, "Extended Ping" determines if there is an unacceptable delay from the underlying physical channel. For example, a large delay may be an indication of a problem on the underlying physical channel. A large delay may be pre-defined to be over a certain period of time such as, for example over 80-90 milliseconds. If the "Extended Ping" test indicates that there is an unusual delay, then method 300 may proceed to step 342 to run one or more test scripts, e.g., "facility level tests". If the "Extended Ping" test indicates that there is no an unusual delay, then method 300 may proceed to step 320.

At step 320, method 300 executes test script "Show VLAN". Test script "Show VLAN" shows each virtual circuit that in network 112. Furthermore, test script logic "Show VLAN" shows the status of each virtual circuit within network 112 such as, for example, identifying each virtual circuit within network 112 and determining whether each identified virtual circuit is up or down. Subsequently, method 300 proceeds to step 322.

At step 322, method 300 determines if all the VLANs are up. If all the VLANs are up, then method 300 proceeds to step 324 where other network tests can be executed. Namely, the problem in the ticket is not related to the underlying physical channel or the logical channels. However, if all the VLANs are not up, then method 300 proceeds to step 354.

At step 354, method 300 run diagnostic test script on the identified VLANs that are not up. In an exemplary embodiment, diagnostic test scripts "Show Controllers gigabit-Ethernet VLAN" and "tag-switch alpha-atom. Ethernet VLAN" are executed. For example, these show commands provide additional information with regard to Layer1 and Layer2 network status. For example, Show controller command would detect whether there is a LOS (Loss of Signal) or LOF (Loss of Frame) in Layer1 or Layer2 network. If LOS or LOF is detected, then the problem is not related to Layer3 logical channels, rather, it is related to Layer1 SONET or Layer2 Ethernet network. Subsequently, method 300 proceeds to step 356 where a result of the diagnostic test script logic is reported and automation is completed. In one embodiment, method 300 moves the ticket to a reporting system (e.g., labeled as ACT) for requiring immediate action to be taken to service the ticket.

Referring back to step 304, if method 300 proceeds to step 308, step 310 or step 312 based on the collected status information, then method 300 proceeds to step 309. At step 309, method 300 runs test script "Show Run Interface". Test script "Show Run Interface" retrieves the configuration information collected at step 304. The configuration information may be, for example, PER IP address, Virtual Route Forwarding table (VRF), Subnet Mask and the like.

Method 300 then proceeds to step 314. At step 314, automated diagnostics system 106 may obtain configuration data of various elements in network 112 from database 110 and compares the configuration data from database 110 to the configuration information retrieved in step 309. For example, the configuration data may be from the PER. In an exemplary embodiment, the PER IP address, VRF and Subnet Mask information obtained from database 110 may be compared to the PER IP address, VRF and Subnet Mask information retrieved in step 309.

At step 326, method 300 determines if the stored configuration data matches the configuration information obtained from the deployed components in the network 112. If method 300 determines that the configuration data is not matched, then method 300 proceeds to step 328, where the problem is reported as a configuration mismatch problem and it is reported to a reporting system so that a facility team is notified to immediately service the ticket. If method 300 determines that there is no configuration mismatch, then method 300 proceeds to step 330.

At step 330, method 300 runs test script "Element Ticket Search". In an exemplary embodiment, test script logic "Element Ticket Search" may search for an element ticket generated by a facility, e.g., between the third party Ethernet network 116 and the Ethernet gateway switch 118, of the network 112. The search may be based upon various parameters such as, for example, node data, shelf data, slot data, port data and the like.

At step 332, method 300 determines if an element ticket is found. If an element ticket is found, then method 300 proceeds to step 334 where the ticket reporting the problem generated at step 302 is linked to the element ticket. Subsequently at step 336, method 300 determines if the attempted link was successful. If the link was successful, then method 300 proceeds to step 340 where the problem is logged. If the link was unsuccessful, then method 300 proceeds to step 338 where an appropriate group associated with the facility section of network 112 such as, for example, a layer 2 group may be notified and the automation is completed.

Referring back to step 332, if no element ticket is found, then method 300 proceeds to step 342. At step 342, method 300 runs test script "Facility Level Test". In an exemplary embodiment, test script "Facility Level Test" tests the physical channel located at the facility, e.g., between the third party Ethernet network 116 and Ethernet gateway switch 118.

At step 344, method 300 determines if the physical channel is okay based upon test script "Facility Level Test". If the test is okay, then method 300 will attempt to isolate the problem to a virtual circuit and proceeds to step 320, as discussed above. If method 300 determines that the test is not okay, then method 300 proceeds to step 346.

At step 346, method 300 waits for a period of time and checks for an element ticket again. Method 300 waits and checks for an element ticket again because it may take a small period of time before an element ticket is actually generated and received. Method 300 may wait for any acceptable period of time such as, for example, approximately five to ten minutes.

At step 348, method 300 determines if a new element ticket was found. If no new ticket was found, then method 300 proceeds to step 350.

At step 350, method 300 runs test script "Show VLAN", similar to step 320. At step 352, method 300 determines if all VLANs are up. If all VLANs are not up, then method 300 proceeds to step 354 to run diagnostic test scripts, as discussed above. If all VLANs are up, then method 300 proceeds to step 356, as discussed above.

Referring back to step 348, if method 300 determines a new element ticket was found, then method 300 proceeds to step 358. At step 358, method 300 determines if the new element ticket is Ethernet Card related. If method 300 determines that the new element ticket is not Ethernet card related, then method 300 proceeds to step 334. Subsequently, method 300 proceeds from step 334, as discussed above. If method 300 determines the new element ticket is Ethernet Card related then method 300 proceeds to step 360. At step 360, method 300 attempts to link the ticket received at step 302 with the new element ticket.

At step 362, method 300 determines if the attempted link was successful. If method 300 determines that the attempted link was successful, then method 300 proceeds to step 366 where the problem is logged. If the attempted link was unsuccessful, then method 300 proceeds to step 364 where an appropriate group associated with the Ethernet Interface Card 120 section of network 112 such as, for example a layer 1 group, may be notified and the automation is completed.

Figure 4:
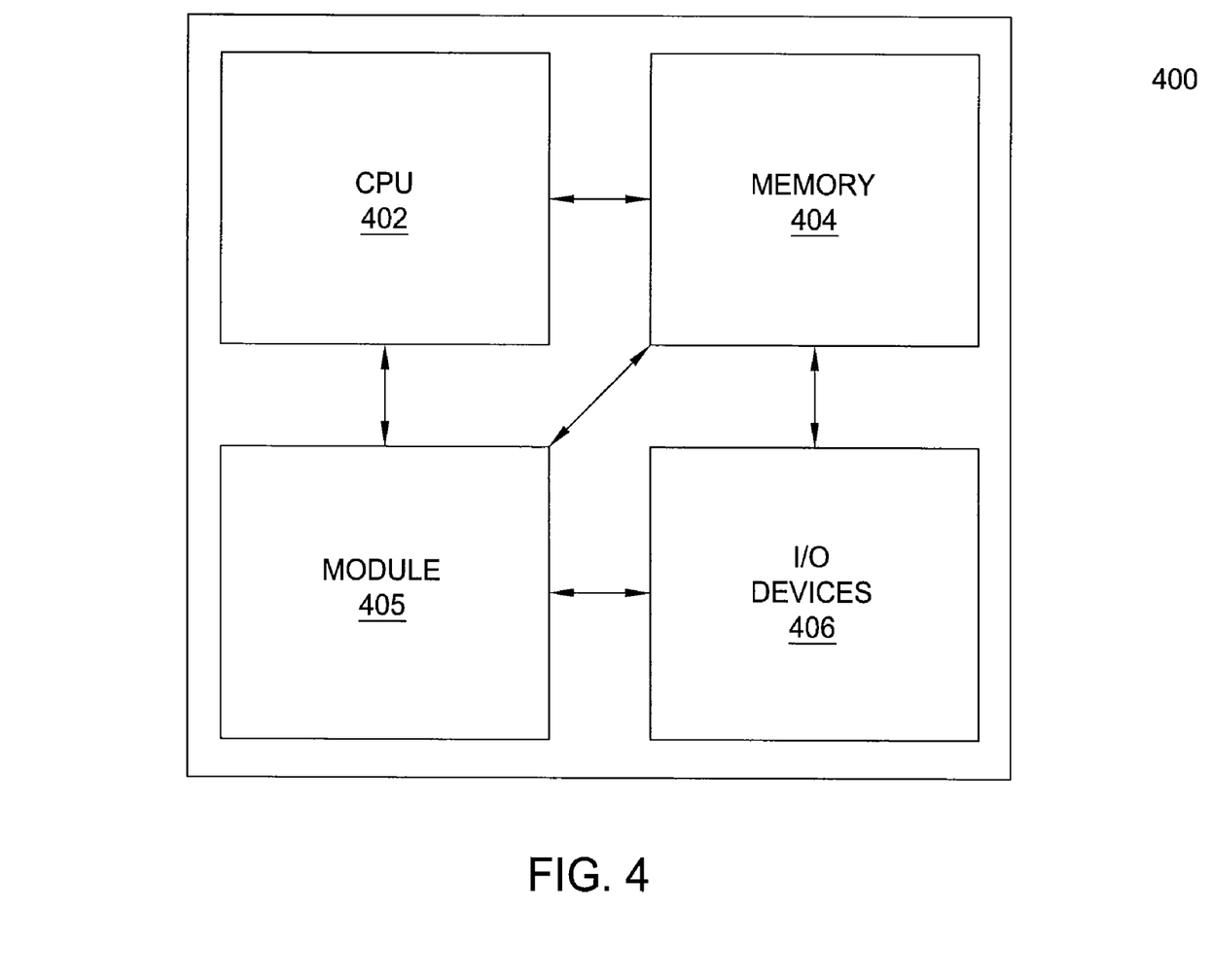
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing the automated network diagnostics, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing automated network diagnostics can be loaded into memory 404 and executed by processor 402 to implement the functions as discussed above. As such, the present method for providing automated network diagnostics 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for automatically diagnosing a problem in a network having a plurality of virtual circuits, comprising:
receiving a ticket indicating a problem;
determining by a processor if said problem is associated with a configuration mismatch, wherein said determining if said problem is associated with said configuration mismatch comprises:
collecting configuration information from at least one router in said network;
retrieving configuration information associated with said at least one router from a database; and
determining if said configuration information collected from said at least one router matches said configuration information retrieved from said database;
determining if said problem is associated with at least one physical channel supporting said plurality of virtual circuits;
verifying status of each of said plurality of virtual circuits if said problem is not associated with said configuration mismatch or said at least one physical channel; and
reporting a result of verifying said status of each of said plurality of virtual circuits.

2. The method of claim 1, further comprising:
searching for an element ticket; and
linking said received ticket to any element ticket that is found.

3. The method of claim 2, further comprising:
determining if any of said found element ticket is related to an Ethernet card of said network; and
linking said received ticket to any of said found element ticket that is related to said Ethernet card.

4. The method of claim 1, wherein said determining if said problem is associated with at least one physical channel comprises at least one of: executing an extended ping test script, or executing a facility level test script.

5. The method of claim 1, wherein said reporting comprises at least one of: logging said result, moving said ticket to a reporting system that requires immediate action for said ticket, notifying a third party or a customer impacted by said problem or generating a work order.

6. The method of claim 1, wherein said plurality of virtual circuits comprises a plurality of Virtual Private Networks (VPNs) or a plurality of Virtual Local Area Networks (VLANs).

7. The method of claim 1, wherein said network comprises an Ethernet network.

8. A non transitory computer-readable medium having stored thereon a plurality of instructions, the plurality of instructions including instructions which, when executed by a processor, cause the processor to perform steps of method for automatically diagnosing a problem in a network having a plurality of virtual circuits, comprising:
receiving a ticket indicating a problem; determining if said problem is associated with a configuration mismatch, wherein said determining if said problem is associated with said configuration mismatch comprises:
collecting configuration information from at least one router in said network;
retrieving configuration information associated with said at least one router from a database; and
determining if said configuration information collected from said at least one router matches said configuration information retrieved from said database;
determining if said problem is associated with at least one physical channel supporting said plurality of virtual circuits;
verifying status of each of said plurality of virtual circuits if said problem is not associated with said configuration mismatch or said at least one physical channel; and
reporting a result of verifying said status of each of said plurality of virtual circuits.

9. The non transitory computer-readable medium of claim 8, further comprising:
searching for an element ticket; and
linking said received ticket to any element ticket that is found.

10. The non transitory computer-readable medium of claim 9, further comprising:
determining if any of said found element ticket is related to an Ethernet card of said network; and
linking said received ticket to any of said found element ticket that is related to said Ethernet card.

11. The non transitory computer-readable medium of claim 8, wherein said determining if said problem is associated with at least one physical channel comprises at least one of: executing an extended ping test script, or executing a facility level test script.

12. The non transitory computer-readable medium of claim 8, wherein said reporting comprises at least one of: logging said result, moving said ticket to a reporting system that requires immediate action for said ticket, notifying a third party or a customer impacted by said problem or generating a work order.

13. The non transitory computer-readable medium of claim 8, wherein said plurality of virtual circuits comprises a plurality of Virtual Private Networks (VPNs) or a plurality of Virtual Local Area Networks (VLANs).

14. The non transitory computer-readable medium of claim 8, wherein said network comprises an Ethernet network.

15. An apparatus for automatically diagnosing a problem in a network having a plurality of virtual circuits, comprising:
means for receiving a ticket indicating a problem;
means for determining if said problem is associated with a configuration mismatch, wherein said means for determining if said problem is associated with a configuration mismatch collects configuration information from at least one router in said network, retrieves configuration information associated with said at least one router from a database, and determines if said configuration information collected from said at least one router matches said configuration information retrieved from said database;
means for determining if said problem is associated with at least one physical channel supporting said plurality of virtual circuits;
means for verifying status of each of said plurality of virtual circuits if said problem is not associated with said configuration mismatch or said at least one physical channel; and
means for reporting a result of verifying said status of each of said plurality of virtual circuits.

16. The apparatus of claim 15, further comprising:
means for searching for an element ticket; and
means for linking said received ticket to any element ticket that is found.

17. The apparatus of claim 15, wherein said plurality of virtual circuits comprises a plurality of Virtual Private Networks (VPNs) or a plurality of Virtual Local Area Networks (VLANs).

* * * * *